(12) United States Patent
Poggiagliolmi (10) Patent No.: US 8,842,494 B2
(45) Date of Patent: Sep. 23, 2014

(54) APPARATUS FOR SENSING MOTION OF A SURFACE

(75) Inventor: Elio Poggiagliolmi, London (GB)

(73) Assignee: Entec Integrated Technologies (GB)

( * ) Notice: Subject to any disclaimer, the term of this patent is extended or adjusted under 35 U.S.C. 154(b) by 865 days.

(21) Appl. No.: 13/062,300

(22) PCT Filed: Sep. 4, 2009

(86) PCT No.: PCT/GB2009/002130
§ 371 (c)(1),
(2), (4) Date: Mar. 4, 2011

(87) PCT Pub. No.: WO2010/026386
PCT Pub. Date: Mar. 11, 2010

(65) Prior Publication Data
US 2011/0164469 A1    Jul. 7, 2011

(30) Foreign Application Priority Data

Sep. 4, 2008    (GB) .................................. 0816165.5

(51) Int. Cl.
*G01M 1/14*    (2006.01)
*G01S 15/00*    (2006.01)

(52) U.S. Cl.
USPC ................................ 367/94; 367/95; 73/1.83

(58) Field of Classification Search
USPC ....................................... 367/94, 95; 73/1.83
See application file for complete search history.

(56) References Cited

U.S. PATENT DOCUMENTS

| | | | |
|---|---|---|---|
| 2,733,597 A | 2/1956 | Hardy | |
| 4,823,601 A | 4/1989 | Barna | |
| 6,325,172 B1 | 12/2001 | Langridge et al. | |

FOREIGN PATENT DOCUMENTS

| | | |
|---|---|---|
| GB | 0816165.5 | 3/2010 |
| WO | WO96/08700 A1 | 3/1996 |
| WO | WO 2010/026386 A2 | 3/2010 |

OTHER PUBLICATIONS

Matar et al.; "Ultrasonic sensing of Vibrations;" Ultrasonics, vol. 36, Issues 1-5; Feb. 1998; pp. 391-396.
Petculescu et al; "Air-coupled ultrasonic sensing of grass-covered vibrating surfaces; qualitative comparisons with laser Doppler vibrometry;" Journal of the Acoustical Society of America; vol. 115, Issue 4; Apr. 2004; pp. 1557-1584.
Notification of Transmittal of the International Search Report and the Written Opinion of the International Searching Authority for International Application No. PCT/GB2009/002130, Mar. 7, 2011.

(Continued)

*Primary Examiner* — Steven Lim
*Assistant Examiner* — Omeed Alizada
(74) *Attorney, Agent, or Firm* — Daly, Crowley, Mofford & Durkee, LLP (57) ABSTRACT

An apparatus for sensing motion of a surface comprises a stabilized platform comprising a support structure and a moveable mass resiliently suspended with respect to the support structure; a transmitter transducer and a receiver transducer mounted on the moveable mass, the transmitter transducer arranged to transmit an acoustic wave towards the surface, and the receiver transducer arranged to receive a reflected wave from the surface, and detection means for measuring motion of the surface based on a Doppler shift in the reflected wave. The detection means may comprise an amplifier arranged to receive a Doppler modulated signal from the receiver transducer, and a phase detector arranged to receive an amplified signal from the amplifier and to provide a demodulated output signal indicative of the motion of the surface. Preferably, the apparatus further comprises relative motion compensation means arranged to remove from the demodulated output signal phase noise caused by motion of the transducers, and to provide a surface motion output signal.

30 Claims, 4 Drawing Sheets

(56) References Cited

OTHER PUBLICATIONS

Matar et al "Ultrasonic Sensing of Vibrations", Ultrasonics, vol. 36, 1998, pp. 391-396.
Petculescu et al "Air-Coupled Ultrasonic Sensing of Grass-Covered Vibrating Surfaces; Qualitative Comparisons with Laser Doppler Vibrometry," J. Acoust. Soc. Am. 115 No. 4, pp. 1557-1564, Apr. 2004.
Search Report dated Dec. 15, 2008 for GB Application No. GB0816165.5.
European Office Action dated Mar. 20, 2014; for EP Pat. Appl. No. 09 785 056.4; 5 pages.
PCT Search Report and Written Opinion of the ISA; for PCT Pat. App. No. PCT/GB2009/002130; dated Mar. 2, 2011; 9 pages.

APPARATUS FOR SENSING MOTION OF A SURFACE

CROSS REFERENCE TO RELATED APPLICATION

This application claims the benefit of International Patent Application PCT/GB2009/002130, filed Sep. 4, 2009, and published in the English language as WO2010/026386 A2, which application claims priority from GB Patent Application number GB0816165.5, filed Sep. 4, 2008.

The present invention relates to sensors for detecting motion of a surface, and in particular uncoupled sensors for detecting vibration using Doppler shifts in transmitted acoustic waves.

BACKGROUND OF THE INVENTION

Contact (coupled) sensors based on inductive, piezoelectric or capacitive transducers, are used almost universally in a host of applications ranging from the detection of vibrations in manmade structures, e.g. bridges, to the monitoring of the earth's naturally occurring, or artificially generated, tremors. For example, in seismic exploration for hydrocarbons and minerals, tremors produced by a source of elastic energy are picked up by detectors placed at or near the earth's surface, in water covered areas, on the ocean bottom and in boreholes.

There are two main drawbacks inherent in coupled sensors:
a. The response of a vibrating structure can be altered by the coupled mass of the sensors;
b. The deployment and retrieval of large numbers of sensors is very inefficient and costly. In seismic exploration over land, many hundreds to several thousand sensors, i.e. geophones or accelerometers, are placed on the earth's surface. Each sensor has attached to its body a metal spike which must be driven individually into the ground by hand, to provide good earth-to-transducer coupling. Vast manpower and logistical support are required to place and move such a large number of sensors over exploration areas measuring from hundreds to thousands square kilometers.

Non-contact (uncoupled) sensors are more suited to applications where transducer coupling effects can alter the response of the vibrating structure to be measured. Vibration measurements made with uncoupled sensors are mostly based on optical waves, electromagnetic microwaves and acoustic ultrasonic waves. The embodiment of these sensors consists of a transducer which emits and directs waves toward the vibrating surface under investigation. The vibrating surface modulates the incident and reflected waves in frequency and phase (Doppler shift). The reflected waves are detected by a receiver sensor and subsequently demodulated to extract the Doppler shift, which is proportional to the velocity of the surface vibrations. Because of the type of measurement performed, these devices are also called velocimeters.

Generally, velocimeters have many inherent drawbacks:
a. Starting with optical sensors, known as Laser Doppler Velocimeters (LDV), they are bulky, expensive, very sensitive to surface roughness and the frequency range of the measured vibrations does not extend below 1 kHz. However, their resolution (the smallest detectable vibration amplitude) can be as high as a few nanometers.
b. Microwave Doppler Velocimeters (MDV) are also bulky and their resolution is several orders of magnitude lower than that obtainable by LDVs. In addition, the accuracy of the Doppler shift measurement is affected by interferences from spurious reflections and other events originating at or just below the surface.
c. Ultrasonic acoustic sensors have found only limited applications in acoustic Doppler vibrometry (ADV) mainly because, compared to LDVs, their resolution is much lower and they lack response to vibrations above approximately 1 kHz.
d. Finally, it is a further very important consideration that all types of uncoupled sensors need to be mounted on an ultra-stable platform, in order to minimize the movement induced in the sensor by ambient noise. Since the surface vibrations are measured relative to the static position of the sensor, sensor movement is one of the major sources of errors in Doppler measurements of surface vibrations. Generally, for experimental set-ups and outdoor applications the platform is provided by a sturdy support, like a rigid purpose built tripod, whereas in more permanent installations, the uncoupled sensor is mounted on a damped large mass or in an anechoic chamber. For very precise measurements inertial platforms are sometimes employed. For use outside of the laboratory and in the field, to obtain for example seismic data measurement, all the above platforms are either too cumbersome or very expensive to implement, or both.

In order to overcome the drawbacks of coupled sensors, it is therefore desirable to provide an uncoupled sensor which is relatively inexpensive, and which is small and durable enough to be deployed easily in large numbers. In order to be useful in applications where coupled sensors are usually employed, it is desirable for the uncoupled sensor to have sufficient resolution to measure earth surface vibrations, but without being too sensitive to surface roughness. Furthermore, it is desirable to provide an uncoupled sensor which is mounted on a platform which is sufficiently stable to allow the sensor to provide accurate measurements, but is durable and inexpensive enough to be used in large numbers in rough terrain and can withstand rough handling.

SUMMARY OF THE INVENTION

Despite the drawbacks of ultrasonic acoustic sensors in terms of resolution, when compared with LDVs, it has been found that for low frequency applications, e.g. sensing of seismic waves, ranging from a few Hertz up to several hundred Hertz, acoustic Doppler vibrometers (ADVs) can outperform LDVs in resolution. In fact, with an electronic demodulation system having the appropriate wide dynamic range, it is possible to achieve resolutions in the order of nanometers. Other advantages of ADVs are the small size, low cost and low sensitivity to surface roughness. The latter property is extremely important for sensing seismic waves on the naturally rough earth surface. In addition, their low cost and small size make the ADVs ideally suited for the rapid and economical deployment, and retrieval, of very large multi-sensor arrays.

The present invention provides an apparatus for sensing motion of a surface, comprising:
a stabilised platform comprising a support structure and a moveable mass resiliently suspended with respect to the support structure;
a transmitter transducer and a receiver transducer mounted on the moveable mass, the transmitter transducer arranged to transmit an acoustic wave towards the surface, and the receiver transducer arranged to receive a reflected wave from the surface, and
a detector that measures motion of the surface based on a Doppler shift in the reflected wave.

Preferably, the detector comprises an amplifier arranged to receive a Doppler modulated signal from the receiver transducer, and a phase detector arranged to receive an amplified signal from the amplifier and to provide a demodulated output signal indicative of the motion of the surface. Preferably, the apparatus further comprises a relative motion compensator arranged to remove from the demodulated output signal phase noise caused by motion of the transducers, and to provide a surface motion output signal.

The support structure may comprise a casing which houses the moveable mass. In one embodiment of the invention the platform for the ADV transmitting-receiving transducers is provided by a damped mass-spring system. This platform is relatively inexpensive, can be made small, and is simple to implement.

The invention further provides a device for sensing motion of a surface, comprising a support structure and a plurality of sensors, wherein the support structure is a stress member, and each of the plurality of sensors comprises an apparatus according to any preceding claim, mounted on the stress member.

In another aspect, the invention provides methods for calibrating a sensing apparatus, as defined in claims beginning "Method for calibrating a sensing apparatus" included herein.

BRIEF DESCRIPTION OF THE DRAWINGS

Embodiments of the invention will now be described, by way of example, with reference to the accompanying drawings, in which.

DESCRIPTION OF THE INVENTION

The invention outlined herein, consists of an acoustic transmitting-receiving sensor for accurate measurements of micro-vibrations on a surface by means of Doppler shift. The sensor requires no coupling to the measured surface and can be placed at an arbitrary distance from the surface. The maximum sensor-to-surface separation is dictated by the strength of the received signal above the noise; it can typically range from a few centimeters to more than a meter.

The following description is for the implementation of a continuous acoustic wave Doppler sensor. However, the invention equally applies to vibration measurements made with pulsed acoustic sensors, laser sensors, and electromagnetic wave sensors. Also the invention equally applies to the use of chirps or other forms of coded signals for measuring Doppler shift. An embodiment of a sensor according to the invention is shown diagrammatically in FIG. 1.

Figure 1:
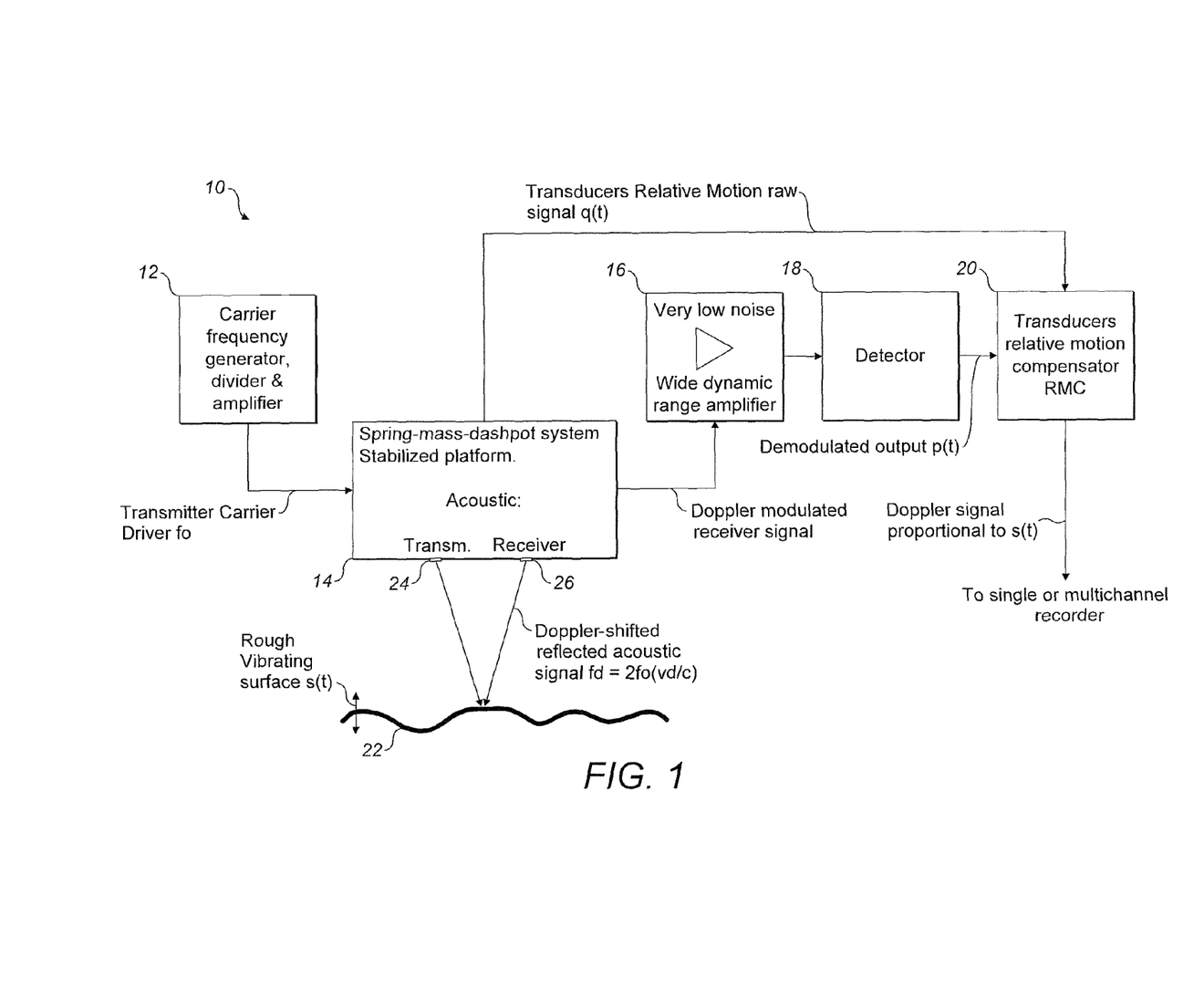
FIG. 1 is a schematic diagram of an uncoupled acoustic Doppler sensor according to the invention.

The uncoupled acoustic Doppler sensor 10 is arranged to measure movement of a rough vibrating surface 22, the movement of which is denoted s(t). The sensor comprises a carrier frequency generator 12 for providing a carrier frequency to an ultrasonic transmitter transducer 24 mounted on a stabilised platform 14 together with a receiver transducer 26, the transmitter arranged to direct an acoustic signal towards the surface 22 such that the signal is Doppler-shifted by the movement of the surface and reflected back to the receiver. An amplifier 16 is arranged to receive the Doppler modulated signal from the receiver, and the output of the amplifier is then supplied to a detector 18, which provides a demodulated output p(t). In this embodiment, there is further provided a relative motion compensator 20, which receives the demodulated signal p(t), as well as a transducer relative motion raw signal q(t) from the stabilised platform 14, and provides an output Doppler signal proportional to s(t), either in digitally coded or analog form, for example to a single or multichannel recorder.

A carrier frequency signal is generated in the carrier frequency generator 12, and is used to drive the piezoelectric transmitter transducer 24 in the stabilised platform 14. The generated signal is a highly stable sine wave generated by a 4 MHz quartz oscillator. The quartz frequency is divided down 100 times to obtain 40 kHz carrier frequency fo. After power amplification the carrier is fed to the 40 kHz transmitter piezoelectric transducer. In this particular example, the choice of a 40 kHz transducer provides a suitable balance between resolution and sensitivity to surface roughness, as discussed in more detail later, but transducers resonating at other frequencies may also be used. More than one transmitter transducer, or an array thereof, can be advantageously employed in the stabilised platform to obtain the desired directivity and bandwidth responses.

The ensuing acoustic signal is projected from the transmitter or transmitters 24 onto the vibrating surface. As a result of the surface time variant displacement, both incident and reflected waves are phase modulated (Doppler shifted) by an amount fd given by $fd=\pm 2\ fo(vd/c)$, where vd is the vibration velocity and c is the velocity of sound in air. Because of the roughness of the surface, the reflected acoustic beam may depart considerably from specular reflection angle and may also undergo scattering. For this reason the receiver transducer 26 must have a wide aperture angle. Also its bandwidth must be sufficiently broad to prevent undue attenuation of the modulation sidebands. In some implementations, electrostatic transducers may be advantageously used in order to meet these requirements more effectively than piezoelectric transducers, although piezoelectric transducers are more readily available in sizes small enough for use in arrays of large numbers of sensors.

More than one receiver transducer, or an array thereof, can be advantageously employed to obtain the desired directivity, sensitivity and bandwidth responses.

Figure 2:
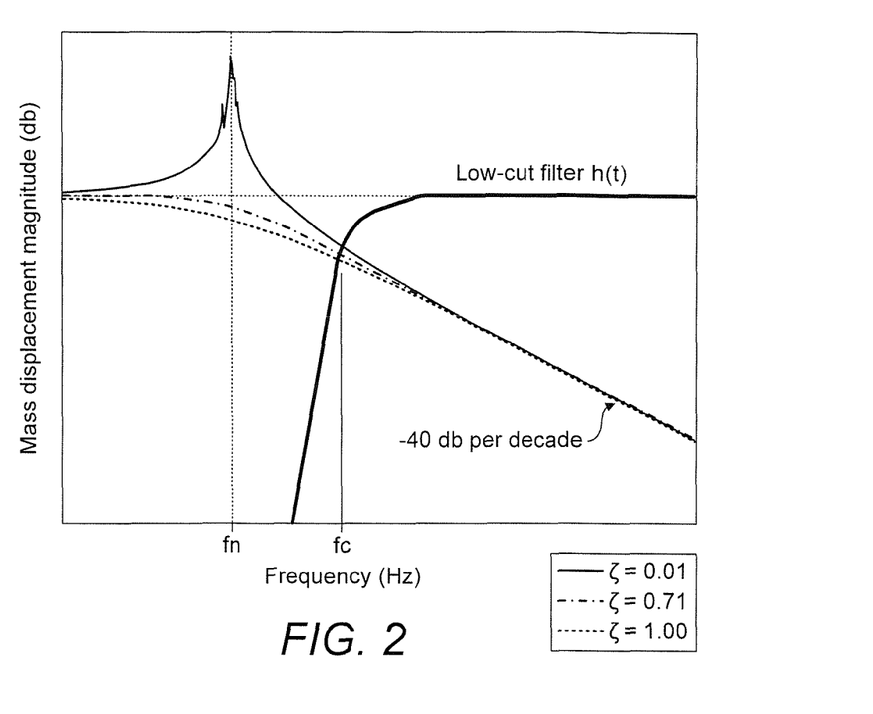
FIG. 2 is a diagram showing the frequency domain response of the stabilised platform of the sensor.

An important aspect of the invention is the method used for isolating both the transmitter and receiver transducers from motion that could be imparted to them by ambient noise and indeed by the vibrating surface being sensed, as the surface may provide, directly or indirectly, physical support for the transducers. Motion imparted to the transducers' bodies will produce a signal at the output of the detector which is indistinguishable from that generated by the vibrating surface. Ideally the objective would be to impart zero motion to the transducers' bodies. In practice, as shown schematically in FIG. 1, the transducers' isolation from motion is provided, partially, within a finite bandwidth, by a platform 14 consisting of a mass, spring, dashpot system. The transmitter and receiver transducers 24, 26 are mounted on the mass of the system. Provided the bandwidth of interest starts above the system's natural resonant frequency (fn), the mass displacement has been found to decrease at a rate of −40 dB per decade of frequency. This attenuation can be seen in FIG. 2, which shows the frequency domain response of the stabilised platform. More specifically, FIG. 2 shows the mass displacement magnitude plotted against frequency, for different values of the damping coefficient, ζ (ζ=0.01, ζ=0.71 and ζ=1.00). The natural resonant frequency of the platform is indicated as fn. Naturally, the damping of the system must be close to critical, to avoid a sharp peak at fn (as shown in FIG. 2). Further details of the platform will be given below.

To ensure high detection sensitivity of the surface vibration velocity, a very low noise wide dynamic range amplifier 16 is used, followed by an accurate phase detector 18 (FIG. 1). The total system noise, referred to the input of the amplifier 16, must be in the order of 1 nV/√Hz and the dynamic range not less than 140 dB. To achieve this wide dynamic range a noise floor of 0.1 μV rms over a minimum signal bandwidth of 150 Hz (~5 Hz to 150 Hz) is required. Moreover, the amplifier must equalize the amplitude of the phase modulated signal, to compensate for changes in the signal strength caused by the vibrating surface roughness. Generally, phase and fm detectors tend to become unstable with large input signal amplitude variations.

A highly accurate low noise detector 18 consisting of a digital or analog phase locked loop (PLL), or some other form of interferometric demodulation scheme, is preferably used to meet the required accuracy and sensitivity of phase demodulation. The PLL must provide a reliable output for surface vibration velocity down to 1 μm/s over a bandwidth from a few Hertz to at least 150 Hz.

Relative Motion Compensator

The transducer relative motion compensator (RMC) 20, shown in FIG. 1, will now be described in more detail. The purpose of the RMC is to further reduce phase noise n(t) produced by residual mass motion that the platform cannot prevent. This motion will be detected as motion of the vibrating surface if it is not compensated for.

As shown in FIG. 2, the platform 14 does not prevent mass motion from taking place between zero frequency and a frequency, fc, which is above the natural resonant frequency, fn, of the platform. For this reason, an appropriate low-cut filter h(t) is applied, to adequately attenuate frequencies below fc in the phase demodulated detector output p(t). Unfortunately within the frequency range 0≤f≤fc, not only the undesired mass motion components n(t) are attenuated by the filter h(t), but also any signal component of the surface vibrations s(t) that falls within the filter frequency attenuation range. Therefore, both fn and fc should preferably be chosen to make the lowest frequency of interest in s(t) fall at least −40 dB from the maximum of the platform response, i.e. fc=fsmin, fc≥10 fn; where fsmin is the minimum frequency of interest in s(t). Obviously fn must be as low as is practical to minimize loss of the signal low frequency bandwidth.

In spite of the intrinsic attenuation afforded by the stabilized platform (−40 dB/decade), together with the low-cut filter, very low magnitude vibrations in s(t) (of the order of nanometers) can be overwhelmed by much stronger noise n(t) (of the order of millimeters). Further attenuation of phase noise is possible by estimating the noise n(t) and then subtracting it from the demodulated output p(t), since p(t)=s(t)+n(t). Of course, the effectiveness of this method of noise attenuation depends largely on the accuracy with which n(t) can be estimated. The procedure consists of first estimating the mass velocity u(t) mathematically by means of an electrical analogical model for the platform. Then the model can be implemented either by electronic hardware (analog) or by software (digital). The inevitable differences between the theoretical model and the real platform together with the inherent inaccuracies in the analog circuitry are likely to make the analog realization unreliable if not outright unstable. The software only solution is therefore the more desirable. This is because all the fine tuning to take account of differences between the theoretical model and the real platform can be done by making use of the flexibility available with software. The downside of the software approach is that the computations are done in "computer time" rather than real time. Alternatively, a hybrid model implementation based on microprocessor technology may provide both hardware computational speed and the flexibility of software. This means that the computations can be advantageously carried out in pseudo real time.

Figure 3:
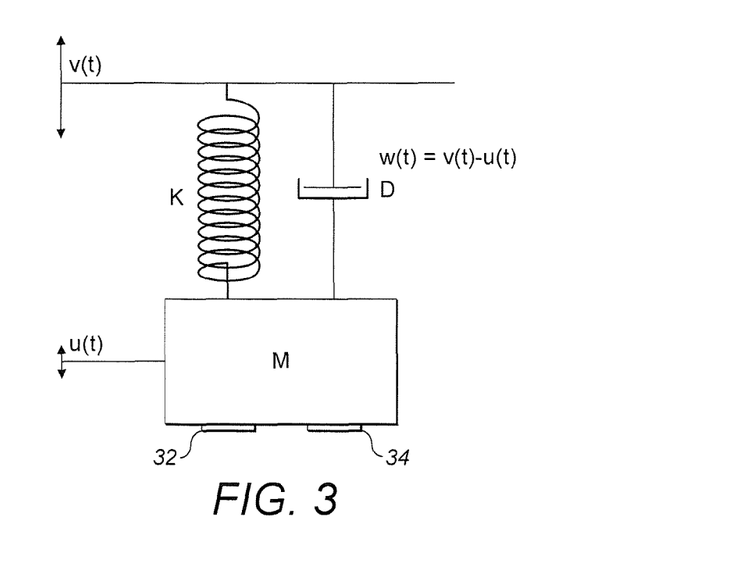
FIG. 3 is a schematic representation of the mechanical components of the stabilised platform.

Without going into the model's algebraic details, the expression giving the mass velocity, referred to the measured surface, is relatively simple to interpret: $U(f)=W(f)\times[ZM/ZP]$; or more compactly: $U(f)=W(f)T(f)$; where: $T(f)=ZM/ZP$; ZM is the impedance of the mass, and ZP is the impedance of the parallel combination of the spring-dashpot, while U(f) and W(f) are respectively the mass velocity and the velocity across the spring-dashpot, both expressed as a function of frequency. FIG. 3 is a schematic representation of the mechanical components of the stabilised platform, showing the mass M to which the transmitter and receiver transducers 32, 34 are mounted, a spring K and dashpot D. The mass velocity, as a function of time, is denoted u(t), and the velocity of the support structure (or casing) to which the mass is attached is denoted v(t). The relative velocity of the mass and casing, which corresponds to a velocity which can be measured directly within the stabilised platform, is denoted w(t), and corresponds to v(t)−u(t).

Simply stated, with above relation it is possible to calculate U(f) in terms of the velocity across the spring-dashpot and the respective mechanical impedances of the mass-spring-dashpot. The impedances can be easily derived from the physical constants characterizing these three mechanical components, i.e. weight, stiffness and damping coefficient. With reference to FIG. 1, the parameter W(f) can be conveniently derived from the platform relative motion transducer output q(t). A detailed description of this and other features of the platform will be given below. It suffices now to point out that $W(f)=(1/\alpha)Q(f)$, where: $\alpha$=volt/velocity=the transducer's electrical-to-mechanical transfer function (transduction factor) and Q(f) is the frequency domain expression of q(t). Once U(f) has been calculated, as indicated above, it can be transformed into a voltage proportional to N(f), which is the frequency domain expression of n(t), i.e. the mass motion component of p(t). Thus, $N(f)=\text{prop.}\{U(f)\}=G\{U(f)\}=(G/\alpha)\{Q(f)T(f)\}$. The measurement of the proportionality/transduction factors G/α, will be discussed in some detail below.

Stabilised Platform

Figure 4:
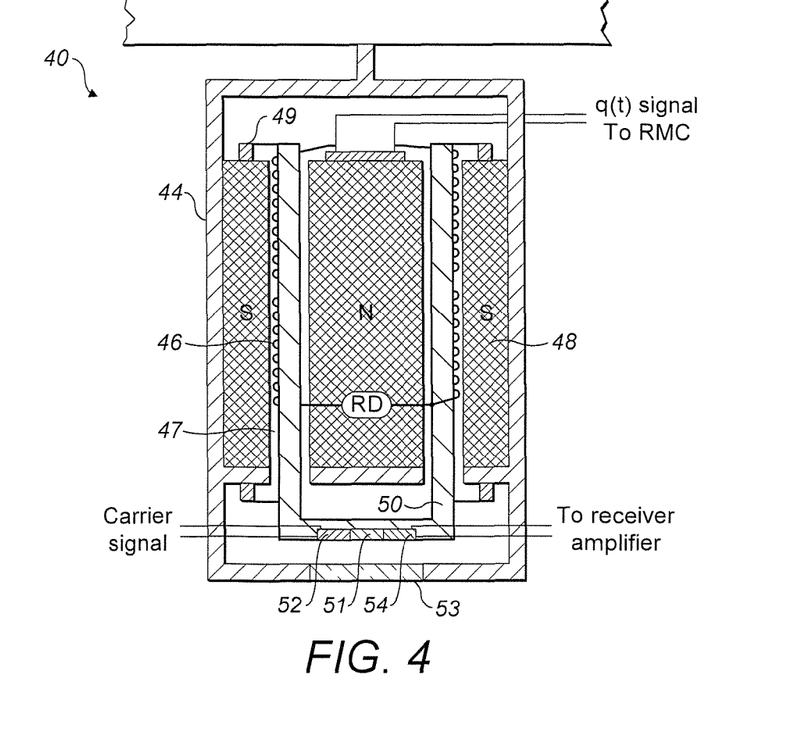
FIG. 4 is a schematic cross-sectional view showing the components of the sensor.

The physical implementation of the stabilized platform in a preferred embodiment is shown in FIG. 4. This arrangement is based on a construction very similar to that of a velocity-sensitive geophone transducer. A typical geophone comprises a casing which houses a spring-mounted coil moving in a magnetic field, arranged such that vibration of the casing causes relative movement between the casing and the coil, which generates an electrical signal. This signal can be used to measure the vibration to which the casing is subjected. In particular, when the casing is subjected to vibration within a particular frequency range, the spring-mounted coil remains substantially stationary due to its inertia, such that the relative movement corresponds mainly to the vibration of the casing. In this way, ground particle velocity is converted into a voltage signal.

The present invention preferably uses a similar principle to provide a stabilised platform onto which the transmitter and receiver transducers are mounted. However, other types of mechanical, electromechanical or electronic devices, including microelectromechanical systems (MEMS), capable of providing a stable platform fully integrated with the ultrasonic transmitter and receiver transducers, and providing a mass moveable with respect to a support structure, can be used. The reasons for choosing a geophone-based construction for the platform are that it is well proven technology, with over 60 years of use by the oil industry as the only detector type for land seismic prospecting, and over the years, large numbers have been manufactured and used in severe environments such as polar, desert, rain forest, etc. In accordance with the invention, this technology can be adapted to the requirements of the stabilized platform for the uncoupled acoustic sensor.

Figure 6:
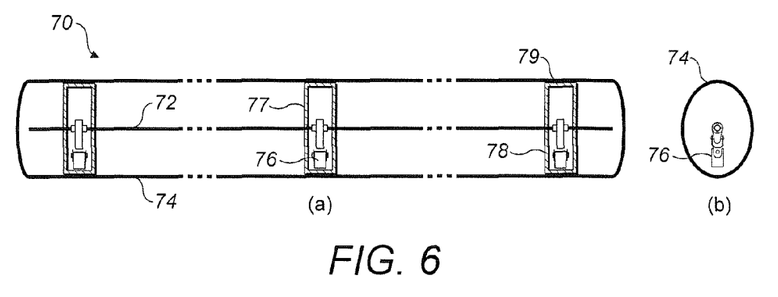
FIG. 6 is a schematic diagram of a cable assembly housing a plurality of sensors.

FIG. 4 shows the essential components of the geophone-based platform 40. The support structure 42 serves as an anchor point upon which the platform casing 44 is fitted. For seismic field recording applications, the support structure is a stress member, measuring up to several kilometers in length and capable of carrying many hundreds to several thousands of individual acoustic sensors spaced along its length. The entire assembly of the stress member and acoustic sensors may typically be encased in a structure suitable for self-propelling or towing along the ground surface. FIG. 6 shows a cross section of a stress member-sensor assembly 70, comprising a flexible stress member 72 encased in a flexible cylindrical sheath 74. The assembly 70 is shown in side view (a), and a front view (b). A plurality of individual sensor assemblies 76 are suspended from the stress member, and are each housed in an enclosure 77, having acoustically absorbent internal enclosure walls 78 and an acoustically transparent window 79 fitted around the cable sheath. A variety of towing or self propelled mechanisms can be fitted externally onto the cylindrical sheath.

Figure 7:
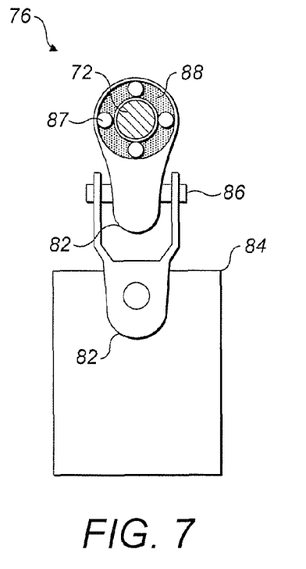
FIG. 7 is a cross-sectional diagram of a sensor mounted on a cable.

Needless to say, a suitable mechanism must be provided, e.g. gimbals, to keep the sensors levelled. FIG. 7 shows in more detail a front view of an individual sensor assembly 76, mounted on the stress member 72 (shown in cross section). Orthogonal gimbals 82 are used to suspend the sensor 84 from the stress member, the pivotal connections being made by means of damped shafts 86. The assembly 76 is pivotally mounted on the stress member using an arrangement of ball bearings 87 in a damping fluid 88. It should be noted that it is important that all of the pivotal joints are suitably damped, in order that the sensors can be used to obtain reliable measurements of the surface vibrations.

Alternatively, the acoustic sensors according to the invention could be deployed on the ground and retrieved either singly, or in patterns, from a moving craft.

Returning now to the stabilized platform details, as shown in FIG. 4, the mass consists of a moving double coil 46 suspended within the air-gap 47 between the poles of a permanent magnet 48, by means of flat spider-web springs 49. A single coil may alternatively be used. Electric damping is provided by a resistor RD connected across one of the coils. The required amount of damping applied to the mass-spring motion (see FIG. 2), is obtained by adjusting the value of RD. Both transmitter and receiver ultrasonic transducers 52, 54 are mounted on the lower part of the moving coil former 50. In the present embodiment, the transducers 52, 54 are 40 kHz miniature piezoelectric transducers, or arrays thereof, each weighing only a few grams. Other types of transducers can be employed, such as capacitance, polymer, MEMS, etc. The choice for the transducers' frequency is a compromise between keeping the sensitivity to surface roughness as low as possible, while achieving an acceptable level of maximum velocity resolution of the sensed vibrations. As mentioned above, an electrostatic receiver transducer may be particularly suited to the requirements of broad directivity and bandwidth, so long as it can be provided in a suitably small size. Acoustic insulation 51 placed between the two transducers prevents the high acoustic power transmitted by the transmitter transducer 52 being picked-up by the receiver transducer 54. A low acoustic attenuation window 53 is fitted on the bottom of the casing 44, opposite the ultrasonic transducers 52, 54, to allow two way passage of acoustic waves.

Further inspection of FIG. 4 reveals that any motion on the support structure 42 is also imparted to the platform casing 44. This motion is expressed as a velocity v(t) in FIG. 3.

The behaviour of mass displacement resulting from the casing motion, can be seen from the curves in FIG. 2 plotted as a function of frequency with the damping coefficient as a parameter. As discussed above in the description of the relative motion compensator, the low frequency components, below fc, may be attenuated by a low-cut filter h(t), as shown in FIG. 2. This is a way of preventing undue interference on the signal s(t) resulting from the mass motion velocity component n(t) of the detector output p(t). The platform attenuation of frequencies above fc is −40 dB/decade. Higher attenuations can be achieved by cascaded mass-spring-dashpot systems, although the additional attenuation is obtained at an increased cost in mechanical complexity and reduced reliability.

As already described above, the output of the signal from the upper moving coil, q(t), is used in the relative motion compensator (RMC) to estimate the noise component n(t) in the demodulated output p(t). Furthermore, it was also pointed out that the ratio of a proportionality factor "G" and transduction factor $\alpha$ (G/$\alpha$) was needed for the estimation of n(t), i.e. N(f)=G/$\alpha$ {Q(f)T(f)}. One way of obtaining G/$\alpha$ is to perform a "factory" calibration of the entire uncoupled acoustic sensor system. First, the platform casing 44 is clamped to a rigid baffler, and an appropriate reflecting surface is placed under the ultrasonic transducers 52, 54. The reflecting surface may be a part of the rigid structure to which the casing is clamped. A known signal f(t), e.g. a sine wave, is then applied to the terminals of the upper moving coil 46. As a result, only the coil assembly and hence the ultrasonic transducers 52, 54 will be set into uniaxial "forced" motion in sympathy with the applied signal. The movement of the transducers will Doppler modulate the transmitted carrier frequency fo which in turn will produce a detector output: r(t)=(G/$\alpha$){f(t)}. Since r(t) and f(t) are both known, the calculation of G/$\alpha$ is a simple matter. The assumption made in the equation for r(t) is that the moving coil resistance and inductance are negligible compared to the impedance of mass-spring-dashpot components.

An alternative approach would be to feed a very sharp impulse $\delta(t_o)$ to the platform moving coil. At the instant $t_j$ ($t_o < t_j$), when the impulse terminates, the coil is disconnected electronically from the impulse generator such that the coil looks into an open circuit. With these initial conditions, the mass velocity in the frequency domain is given by: U(f)=K (1/$\alpha$){T(f)}, where K is the "white" spectrum of the impulse. Hence, the output O(f) of the detector can be found by: O(f)=(G/$\alpha$){T(f)}. The constant K has not been included in the last expression since its value is known and can be compensated for. The chief advantage of this approach is that no analogous model for T(f) is required since this parameter is obtained from the impulse measurement. Thus, the noise component n(t) in p(t) can be calculated either in the frequency domain as: N(f)=O(f)Q(f), or in the time domain as: n(t)=o(t)□q(t), where, o(t) is the time domain expression (Fourier transform) of O(f) and □ stands for "convolved with".

As shown above in the description of the relative motion compensator, the surface vibration velocity s(t) can be computed by: s(t)=[p(t)−n(t)]. Upon expanding n(t), this expression can be written as: s(t)=[p(t)−(G/α){t(t)}□{q(t)}], where (G/α) is a gain factor defined above as the ratio of proportionality and transduction factors (see the description of the relative motion compensator above), t(t) is the time domain expression of the velocity ratio of mass/(spring-dashpot) in the platform, while q(t) is the output signal from the platform moving coil. The noise term total transfer function (G/α){t(t)} can be determined using the impulse measurement method described above.

The uniaxial motion of the platform mass can also be advantageously monitored by means of a single accelerometer fitted on the inertial mass. A MEMS accelerometer is ideally suited for this purpose because of its small size and excellent low frequency sensitivity. MEMS accelerometers are available with a variety of outputs: frequency, digital and analog. For generality and compatibility with the mathematical notation used above, the symbols used in this description will represent physical quantities such as acceleration velocity and voltages.

Since the unit used for the detector output p(t) is velocity (see FIG. 1), the mass acceleration a(t), picked up by the accelerometer, must also be converted into velocity b(t) before it can be applied to estimate the noise n(t). Conversion of a(t) into b(t) is accomplished by convolution of a(t) with an integrator operator i(t), such that: b(t)={a(t)}□{i(t)}. For simplicity, it is assumed that the velocity signal b(t) is also the mass motion velocity u(t), i.e. b(t)=u(t). The output voltage c(t) produced by the accelerometer, is related to u(t) through the accelerometer transduction factor β=voltage/velocity. Thus: c(t)=β{u(t)}.

Employing the same factory calibration procedure, described above, for applying "forced" motion to the platform mass, the signal appearing at the output of the detector is identical to that already defined above and it is repeated here for convenience: r(t)=(G/α){f(t)}.

However, the accelerometer output converted into velocity, resulting from the application of f(t) to the platform coil, is defined as: d(t)=(β/α){f(t)}. Solving both expressions in the frequency domain for the ratio (G/β), the following relationship is obtained: (G/β)={R(f)}/{D(f)}. Since R(f) and D(f) are respectively the frequency domain expressions of the detector and accelerometer outputs, measured with the platform casing rigidly clamped to a baffler, the ratio (G/β) can be obtained quantitatively.

The expression for the noise n(t) can now be derived by combining both the accelerometer output (see above), defined in the frequency domain as C(f)=β{U(f)}. and the ratio (G/β) as defined above. Recalling from the description of the RMC above that the noise N(f) found at the detector output is given by N(f)=G{U(f)}, then N(f)={R(f)}/{D(f)}C(f). It should be noted that, when using an accelerometer to estimate the phase noise, the expression for (G/β) does not depend on a knowledge of the induced mass movement, such that any movement of the mass can be used to calibrate the sensor. By contrast, the derivation of (G/α), described above, requires full knowledge of the induced mass movement, and hence the use of a known input signal Finally, all the operations on the MEMS accelerometer output leading to the estimation of the noise term n(t) are preferably carried out in the RMC unit. As already stated above, an additional purpose of the RMC unit is to provide noise cancellation from the detector output p(t).

The main advantages of using a MEMS accelerometer to monitor the mass motion velocity u(t) are:
 a. The noise n(t) (accelerometer derived noise ADN) can be readily calculated without the need for an electromechanical model of the accelerator transducer.
 b. It is possible to continuously compare ADN to the noise derived from the platform moving coil output (coil derived noise CDN), where both an accelerometer and a moving coil are provided. This comparison can considerably increase the confidence in the estimated noise.
 c. Improved accuracy of noise estimation can be achieved by using both the ADN and the CDN, and in particular by averaging these two different noise estimates.

Because of their small size, MEMS accelerometers are particularly suited to being fitted on the platform mass.

Lastly, under certain conditions, the transfer function of the noise term n(t) can be estimated with only a statistical knowledge of s(t) and the measured signal q(t), by means of well known least squares algorithms, e.g. Wiener-Levinson. This method will yield useful results provided there is negligible correlation between s(t) and q(t).

Figure 5:
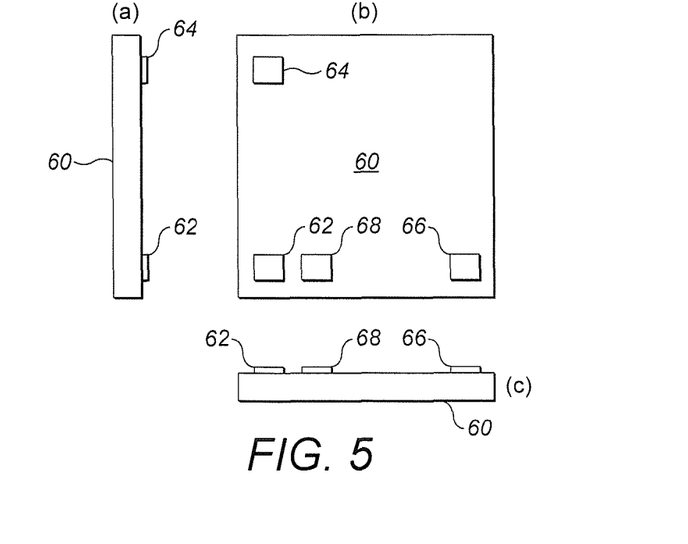
FIG. 5 shows schematically the geometry of acoustic transducers in a further embodiment of the sensor, for sensing vertical and horizontal components of the surface vibration velocity.

The closely spaced transmitter and receiver ultrasonic transducers layout, mounted on the mass of the platform in FIG. 4, can only sense the vibration velocity component normal to the surface. To sense velocity components parallel to the vibrating surface, the value of the grazing angle of the reflected Doppler modulated carrier must depart considerably from the vertical. This condition is satisfied at relatively large source-receiver offsets of the transducers assembled on the platform mass, and an embodiment of the invention using this arrangement is shown in FIG. 5, in side view (a), bottom plan view (b), and front elevation (c). FIG. 5 shows schematically (not to scale) the transducer substrate 60, and the transducers mounted thereon. The main feature of the layout in FIG. 5, is the two long offset transducers (long offset y receiver 64 and long offset x receiver 66), placed orthogonally at a distance from transmitter transducer 62, to sense the components of the x, y velocity field. On the same assembly there is a short offset transducer 68 for the (near) vertical, z, velocity field. The three velocity field components (3C) can be sensed with a minimum of four transducers, i.e. one transmitter and three receivers. A greater number of transducers would obviously improve the directivity and gain performance, but such an improvement has to be weighed against added complexity.

The dimensions of the orthogonal array depend on the value of the grazing angle and the separation of the substrate from the vibrating surface. Assuming a grazing angle of 60° and a substrate-to-surface separation of 0.02 m, the transmitter-to-receiver offset is 0.01 m. Preferably, the offset should be kept well below the critical value at which the first received arrival is the energy refracted along the earth's surface, or otherwise a processor may be provided for distinguishing between desired and undesired signals. With this scheme for acquiring 3C vibration velocity data and appropriate computer processing software, it is possible to obtain reliable vibration velocities along x,y,z coordinates. This feature is particularly useful for deriving seismic elastic wave parameters for characterization of the earth subsurface.

An alternative to the arrangement shown in FIG. 5 is an array consisting of many transducers filling-up a space similar to that of the substrate shown in FIG. 5. With such an arrangement and adequate software, it is possible to simulate optimum arrays (including phased arrays) capable of discriminating the desired from the undesired signals in the vibrating surface.

A further modification of the invention would be to use MEMS technology, as discussed above, to implement a fully integrated 3C Doppler sensor inclusive of noise cancellation electromechanical and electronic components.

In conclusion, the uncoupled acoustic sensor (UAS) of a preferred embodiment of the present invention for measuring surface vibrations consists two novel components:

a. An acoustic Doppler velocimeter (ADV) capable of measuring components of the x, y, z vibrations velocity field (3C) without requiring physical coupling to the measured surface.

b. An electromechanical stable platform which, together with electronic Doppler noise cancellation, prevents the signal generated by the surface vibrations being corrupted by noise resulting from the ADV transducers' relative motion.

In addition to the capability of the ADV to acquire 3C data, it has a sensitivity in the order of 1 μm/s, a dynamic range of typically 140 dB, broad bandwidth extending several hundred Hertz and tolerance to surface roughness. The latter property is extremely important for sensing seismic waves on the naturally rough earth surface.

The ADV's low cost and small size makes it ideally suited for the rapid deployment and retrieval of very large multi-sensor arras. In a preferred arrangement, the deployment and movement of very large numbers of uncoupled sensors over vast areas can be carried out very rapidly and efficiently by means of highly mechanized means. A typical mechanized system consists of a stress member, a few kilometers long, to provide the support structure for many hundreds to several thousands of sensors, spaced along its length. The entire stress member-sensor assembly may be encased in a structure suitable for self propelling, or towing, close the ground.

Since there is no need to "plant" the uncoupled sensors, the manpower requirements for seismic surveys will be substantially reduced. As a result, land and transition zone seismic surveys are made more cost effective and can be executed within a much shorter time compared to conventional surveys employing coupled sensors. To make the UAS more compact and lightweight, MEMS technology can be employed to implement an integrated construction of the platform and ADV. In particular, by using appropriate technologies, it is possible to implement the entire UAS, including the transmitter and receiver transducers and the phase noise cancellation system (RMC), on a single chip.

Furthermore, by positioning the sensor's receiver transducers orthogonally, at short and long offsets with respect to the transmitter, it is possible to acquire 3C vibration velocity data. This feature is particularly useful for multi-component seismic data acquisition. With the appropriate computer processing software, 3C seismic data can be transformed into elastic wave parameters that provide extremely important information for locating subsurface features where there is a high probability of oil and gas accumulations.

The invention claimed is:

1. Apparatus for sensing motion of a surface, comprising:
a stabilised platform comprising a support structure and a moveable mass resiliently suspended with respect to the support structure;
a transmitter transducer and a receiver transducer mounted on the moveable mass, the transmitter transducer arranged to transmit an acoustic wave towards the surface, and the receiver transducer arranged to receive a reflected wave from the surface, and
a detector that measures motion of the surface based on a Doppler shift in the reflected wave.

2. Apparatus according to claim 1, wherein the detector comprises an amplifier arranged to receive a Doppler modulated signal from the receiver transducer, and a phase detector arranged to receive an amplified signal from the amplifier and to provide a demodulated output signal indicative of the motion of the surface.

3. Apparatus according to claim 2, wherein the amplifier is arranged to equalise the amplitude of the Doppler modulated signal.

4. Apparatus according to claim 2, wherein the amplifier has a dynamic range of at least 140 dB.

5. Apparatus according to claim 1, comprising an array of transmitter transducers and/or an array of receiver transducers.

6. Apparatus according to claim 1, wherein the stabilised platform includes an electrically conductive coil and a magnet, whereby relative movement of the moveable mass and support structure provides an induced electrical output signal across the coil dependent on the relative movement.

7. Apparatus according to claim 6, wherein an electrical resistor is connected across the coil to provide electric damping of the relative movement.

8. Apparatus according to claim 1, further comprising an accelerometer attached to the mass, whereby movement of the mass provides an electrical output signal dependent on the movement.

9. Apparatus according to claim 1, wherein the moveable mass is resiliently suspended with respect to the support structure by one or more springs.

10. Apparatus according to claim 2, further comprising a relative motion compensator arranged to remove from the demodulated output signal phase noise caused by motion of the transducers, whereby to provide a surface motion output signal.

11. Apparatus according to claim 10, wherein the relative motion compensator comprises a low-cut filter, arranged to filter the demodulated output signal.

12. Apparatus according to claim 11, wherein the low-cut filter has a cut-off frequency at least one decade above a natural resonant frequency of the stabilised platform.

13. Apparatus according to claim 10, wherein the relative motion compensator comprises a phase noise estimator that estimates the phase noise, the relative motion compensator being further arranged to subtract the estimated phase noise from the demodulated output signal.

14. Apparatus according to claim 13, wherein the phase noise estimator is arranged to determine the estimated phase noise on the basis of an estimate of the velocity of the mass.

15. Apparatus according to claim 14, further comprising an accelerometer attached to the mass, whereby movement of the mass provides an electrical output signal dependent on the movement, wherein the phase noise estimator is arranged to receive the output signal from the accelerometer, and further comprises an integrator that integrates the received accelerometer signal to estimate the mass velocity.

16. Apparatus according to claim 13, wherein the phase noise estimator is arranged to determine the estimated phase noise using an electrical analogical model of the stabilised platform.

17. Apparatus according to claim 15, wherein the phase noise estimator is arranged to receive a signal dependent on relative movement between the moveable mass and the support structure, and to estimate the mass velocity on the basis of the relative movement signal and stored parameters relating to mechanical impedances of the stabilised platform, the model topology and respective mechanical constants.

18. Apparatus according to claim 13, wherein the phase noise estimator is arranged to receive a voltage signal q(t) dependent on relative movement between the moveable mass and the support structure, and to estimate the phase noise on the basis of the signal q(t), a modelled transfer function t(t) of the platform relating the relative movement to the mass velocity, and a stored calibration factor (G/α).

19. Apparatus according to claim 13, wherein the phase noise estimator is arranged to receive a signal dependent on relative movement between the moveable mass and the support structure, and to estimate the phase noise on the basis of the relative movement signal q(t) and a stored total transfer function (G/α){t(t)} relating the relative movement to the phase noise.

20. Apparatus according to claim 13, wherein the phase noise estimator is arranged to receive a signal dependent on relative movement between the moveable mass and the support structure, and to apply a least squares method to estimate the phase noise on the basis of the relative movement signal q(t) and a statistical knowledge of the surface motion output signal s(t).

21. Apparatus according to claim 15, wherein the phase noise estimator is arranged to estimate the phase noise on the basis of the estimated mass velocity and a stored calibration factor (G/β).

22. Apparatus according to claim 1, wherein the receiver transducer is positioned relative to the transmitter transducer so as to detect motion of the surface in a first direction substantially normal to the surface, the apparatus further comprising at least second and third receiver transducers mounted on the moveable mass and orthogonally offset from the transmitter transducer so as to detect components of the motion of the surface in respective directions orthogonal to the first direction.

23. Apparatus according to claim 22, comprising an array of second receiver transducers and an array of third receiver transducers.

24. Device for sensing motion of a surface, comprising a support structure and a plurality of sensors, wherein the support structure is a stress member, and each of the plurality of sensors comprises a motion sensing apparatus mounted on the stress member, the motion sensing apparatus comprising:
   a stabilised platform comprising a support structure and a moveable mass resiliently suspended with respect to the support structure;
   a transmitter transducer and a receiver transducer mounted on the moveable mass, the transmitter transducer arranged to transmit an acoustic wave towards the surface, and the receiver transducer arranged to receive a reflected wave from the surface, and
   a detector that measures motion of the surface based on a Doppler shift in the reflected wave.

25. Device according to claim 24, wherein the stress member and the plurality of sensors are encased in an outer housing and the device further comprises a propelling mechanism that propels the housing into position on the surface.

26. Device according to claim 24, further comprising an orienting mechanism that orients the sensors with respect to the surface, so as to enable measurement of the surface motion.

27. Method for calibrating a sensing apparatus, the sensing apparatus comprised of a stabilised platform comprising a support structure and a moveable mass resiliently suspended with respect to the support structure; a transmitter transducer and a receiver transducer mounted on the moveable mass, the transmitter transducer arranged to transmit an acoustic wave towards the surface, and the receiver transducer arranged to receive a reflected wave from the surface; and a detector that measures motion of the surface based on a Doppler shift in the reflected wave to generate a demodulated signal, wherein the stabilised platform comprises an electrically conductive coil and a magnet, whereby relative movement of the moveable mass and support structure provides an induced electrical output signal across the coil dependent on the relative movement, the method comprising:
   attaching the support structure of the sensing apparatus to a rigid structure such that the support structure is prevented from moving and the transmitter transducer is arranged to direct an acoustic wave towards a fixed, acoustically reflecting surface of the rigid structure,
   operating the apparatus to transmit the acoustic wave and receive and demodulate the reflected wave,
   applying a known signal f(t) to the coil to induce forced motion of the mass,
   measuring the demodulated output signal r(t) from the detector while the known signal f(t) is applied,
   using the relationship r(t)=(G/α){f(t)}, where G/α is a calibration factor of the apparatus, to calculate the calibration factor, and
   storing the calculated calibration factor.

28. Method for calibrating a sensing apparatus, the sensing apparatus comprised of a stabilised platform comprising a support structure and a moveable mass resiliently suspended with respect to the support structure; a transmitter transducer and a receiver transducer mounted on the moveable mass, the transmitter transducer arranged to transmit an acoustic wave towards the surface, and the receiver transducer arranged to receive a reflected wave from the surface; and a detector that measures motion of the surface based on a Doppler shift in the reflected wave to generate a demodulated signal, wherein the stabilised platform comprises an electrically conductive coil and a magnet, whereby relative movement of the moveable mass and support structure provides an induced electrical output signal across the coil dependent on the relative movement, the method comprising:
   attaching the support structure of the sensing apparatus to a rigid structure such that the support structure is prevented from moving and the transmitter transducer is arranged to direct an acoustic wave towards a fixed, acoustically reflecting surface of the rigid structure,
   operating the apparatus to transmit the acoustic wave and receive and demodulate the reflected wave,
   applying a sharp impulse $\delta(t_o)$ to the coil using an impulse generator, to induce forced motion of the mass,
   electronically disconnecting the coil from the impulse generator at the time when the impulse terminates, so that the coil is in an open circuit,
   measuring the demodulated output signal O(f) from the detector at least immediately following the impulse,
   using the relationship O(f)=(G/α){T(f)}, where G/α{T(f)} is the total transfer function of the apparatus, to determine the total transfer function, and
   storing the determined total transfer function.

29. Method for calibrating a sensing apparatus, the sensing apparatus comprised of a stabilised platform comprising a support structure and a moveable mass resiliently suspended with respect to the support structure; a transmitter transducer and a receiver transducer mounted on the moveable mass, the transmitter transducer arranged to transmit an acoustic wave towards the surface, and the receiver transducer arranged to receive a reflected wave from the surface; an accelerometer attached to the moveable mass, whereby movement of the moveable mass provides an electrical output signal dependent on the movement; and a detector that measures motion of the surface based on a Doppler shift in the reflected wave to generate a demodulated signal, the method comprising:

attaching the support structure of the sensing apparatus to a rigid structure such that the support structure is prevented from moving and the transmitter transducer is arranged to direct an acoustic wave towards a fixed, acoustically reflecting surface of the rigid structure,     operating the apparatus to transmit the acoustic wave and receive and demodulate the reflected wave,     inducing a forced motion of the mass,     measuring the demodulated output signal $R(f)$ from the detector, and the output signal $D(f)$ from the accelerometer, during the induced motion,     using the relationship $\{R(f)\}/\{D(f)\}=(G/\beta)$, where $G/\beta$ is a calibration factor of the apparatus, to calculate the calibration factor, and     storing the calculated calibration factor.

30. Method according to claim 29, wherein the stabilised platform of the sensing apparatus includes an electrically conductive coil and a magnet, and the step of inducing a forced motion of the mass comprises applying a signal to the coil.

\* \* \* \* \*